United States Patent Office 3,066,997
Patented Dec. 4, 1962

3,066,997
LEATHER TREATMENT PROCESS AND COMPOSITION
Maynard B. Neher, Columbus, and Victor G. Vely, Hilliards, Ohio, assignors, by mesne assignments, to Titekote Corporation, Wilmington, Del., a corporation of Delaware
No Drawing. Filed Oct. 14, 1959, Ser. No. 846,245
14 Claims. (Cl. 8—94.21)

This invention relates to a substituted-amine composition used to treat leather to achieve superior properties, a process for treating leather to greatly improve its surface properties, and to the leather product resulting therefrom. More particularly, this invention relates to the novel treatment of leather, which has previously been processed to the crusted state, with a substituted-amine composition that is the product of the reaction of a diisocyanate or diisothiocyanate with a polyfunctional alcohol, amine, or amino alcohol.

Reaction products of polyfunctional alcohols or amines and diisocyanates have been developed and used commerically as surface coatings for materials as varied as steel, wood, concrete, and leather. In many of these existing formulations and applications, polyfunctional materials such as trimethylol propane, castor oil, or hydroxyl-terminated polyesters are reacted with a diisocyanate, then mixed with a curing agent and applied to the material to provide a continuous film or coating. Such coatings do not impregnate leather but, rather, are applied over the surface of leather to form a surface coating. These polyurethane coatings of the prior art are intended to act as a physical protection of the leather surface. They are designed in such a manner that impregnation of the leather normally does not occur to any significant extent and thus they do not chemically react with, or modify, the surface of the leather. Further, if the surface of the crusted leather is deliberately impregnated with these polyurethane materials prior to their formation as a continuous film or coating, the leather becomes inflexible, exhibits surface cracking when folded, and shows significant decrease in many physical properties.

It is an object of this invention to provide a process for treating leather that will substantially enhance the surface properties of the leather.

It is another object of this invention to provide a new leather-treating composition comprising a modified isocyanate.

It is also an object of this invention to provide a new leather-treating composition comprising a modified isothiocyanate.

It is a further object of this invention to provide a new leather product that is significantly more scuff- and abrasion-resistant, without detriment to the other physical properties commonly attributed to leather.

Still another object of this invention is to produce a treated leather that essentially remains soft and does not become inflexible.

The above objects are achieved by treating leather, which has been previously processed to the crusted state, with a substituted amine. The substituted amines of interest are modified dissocyanates and diisothiocyanates. While the leather must have been processed through the crusted state for this treatment to be effective, most leather that has already received a base or pigment coat is not amenable to this treatment, because the base or pigment coat prevents the modified isocyanate or isothiocyanate composition from penetrating into the leather. Any other coating that may be applied to leather during its treatment, which will not prevent the penetration of the modified isocyanate or isothiocyanate composition of this process into the leather, will not interfere with the practice of this procedure and the beneficial results obtained therefrom.

To form the composition which is used to treat the leather, a diisocyanate or diisothiocyanate is reacted with a difunctional alcohol, amine, or amino alcohol to form a monomeric condensation product. There should be two isocyanate or isothiocyanate groups present for each hydroxyl and/or amine group present to prepare the monomeric condensation product. To achieve the best results, a slight excess of diisocyanate or diisothiocyanate should be used over the amount calculated as the 2:1 equivalent so as to compensate for water that may be present in the difunctional compound and in the reaction solvent employed. The condensation product thus formed contains essentially two free isocyanate or isothiocyanate groups, one at each end of the molecule.

The linkage formed through the reaction of an hydroxyl group with an isocyanate group is a carbamate. A carbamate group or linkage may be depicted as follows:

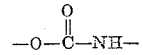

The reaction of a hydroxyl group with an isothiocyanate group yields a thiocarbamate group:

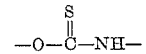

The linkage formed through the reaction of an amine group with an isocyanate group is a substituted urea which may be depicted as follows:

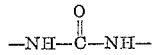

A thiourea is formed through the reaction of an amine group and an isothiocyanate group:

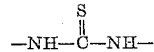

Where the difunctional compound is an alcohol, the reaction with a diisocyanate compound may be illustrated as follows:

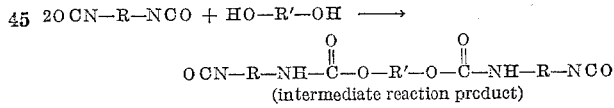
(intermediate reaction product)

In the above formula, and those that follow, R denotes a divalent radical; R' denotes a divalent organic radical; and R" denotes a polyvalent organic radical.

The intermediate reaction product described above is then reacted with additional quantities of a difunctional alcohol or amine in such a manner as to form a low polymer terminated with two free isocyanate or isothiocyanate groups, or is reacted with a polyhydroxy or polyamine to form a monomeric condensation product containing three or more free isocyanate or isothiocyanate groups. In this second reaction the proportions of the reactants may be varied so as to achieve products of various molecular size. The following equation illustrates one such possible reaction involving the reaction of an intermediate reaction product containing isocyanate groups with a diol to form a low linear polymer terminated with two free isocyanate groups:

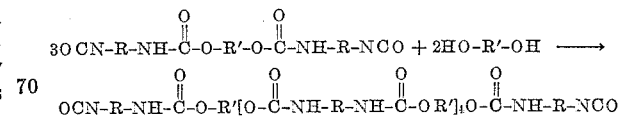

The following formula is intended to be illustrative of one of the large monomers that may be formed where polyhydroxy cross-linking compounds are employed:

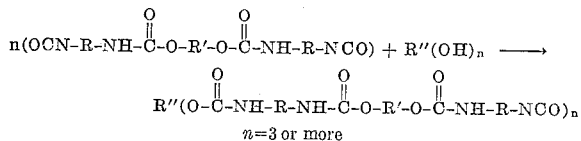

$n = 3$ or more

The reaction products obtained when a diisothiocyanate is used as a reactant in place of the diisocyanate will be identical to the formulations illustrated above, except that in all cases the oxygen of the isocyanate and carbonyl radicals will be replaced by a sulfur atom. The linkage formed through the reaction of a hydroxyl group with an isothiocyanate is a thiocarbamate. The linkage formed through the reaction of an amine group with an isothiocyanate is a substituted thiourea.

The products described above are illustrative of the modified isocyanate and isothiocyanate compositions that are of great value in treating leather. In preparing these compositions, among the organic compounds, both aromatic and aliphatic diisocyanates and diisothiocyanates may be used as reactants. The aliphatic diisocyanates, however, are more toxic and for this reason are not preferred.

Among those organic diisocyanates and diisothiocyanates that may be used, the following are representative of those containing an aliphatic nucleus:

Hexamethylene diisocyanate
Ethylene diisocyanate
Trimethylene diisocyanate
Decamethylene diisocyanate
Tetramethylene diisocyanate
Propylene diisocyanate
Butylene-1,2-diisocyanate
Butylene-2,3-diisocyanate
Decamethylene diisothiocyanate
Propylene diisothiocyanate
Butylene-1,3-diisothiocyanate The following are representative of organic diisocyanates, and diisothiocyanates, which contain an aromatic nucleus, that may be used as reactants:

2,4-tolylene diisocyanate
2,6-tolylene diisocyanate
3,3'-bitolylene 4-4'-diisocyanate
Diphenyl methane 4,4'-diisocyanate
3,3'-dimethyl diphenyl methane 4,4'-diisocyanate
m-Phenylene diisocyanate
p-Phenylene diisocyanate
o-Phenylene diisocyanate
p-Phenylene diisothiocyanate
2,4-tolylene diisothiocyanate
2,6-tolylene diisothiocyanate Inorganic diisocyanates may be used in place of the organic diisocyanates and diisothiocyanates. An example of an inorganic diisocyanate is sulfodiisocyanate.

The difunctional alcohol or amine reacted with the diisocyanate or diisothiocyanate is preferably a linear polyether that is a glycol having its hydroxyl groups separated by a repeating ether linkage such as ethylene oxide, propylene oxide, or butylene oxide. These glycols are known as polyoxyethylenes, polyoxypropylenes, and polyoxybutylenes. Examples of the polyoxyethylenes useful as reactants are the polyethylene glycols having a molecular weight ranging from about 200 to about 4000. Examples of the polyoxypropylenes useful as reactants are the polypropylene glycols having a molecular weight ranging from about 200 to about 4000. Examples of polyoxybutylenes useful as reactants are the polybutylene glycols having a molecular weight ranging from 200 to 4000. Moreover, either mixtures of different molecular weights of one type of polyether or mixtures of different polyethers can be employed as reactants so as to produce a particular product.

Other suitable difunctional hydroxy-terminated compounds that can be reacted with a diisocyanate or diisothiocyanate are hydrocarbon derivatives, such as polymethylene glycols having a molecular weight ranging from about 200 to about 4000 and adducts of diethylene glycol and chloroformates, such as monoethylene glycol bis chloroformate and diethylene glycol bis chloroformate.

Suitable amines for reaction with the diisocyanates or diisothiocyanates to form the modified compounds of interest, had to be specially prepared, since they are not available commercially. The amine used as a reactant is either a diamine or a polyamine, depending on the end product desired. Examples of diamines that were used in the preparation of the intermediate reaction product are octadecamethylene - 1,18 - diamine and condensation products of adipic acid and hexane diamine. They can be prepared by laboratory procedures well known in the art.

The following are examples of some of the polyfunctional materials that may be employed as reactants to prepare the modified isocyanate or isothiocyanate compositions:

(1) Castor oil, castor oil modified with polyols and trihydroxy polyoxypropylenes having three linear chains and three hydroxyl groups with either glycerine, trimethylol propane, or hexane as the nucleus of the molecule; triamine prepared from diethylenetriamine, tolylene diisocyanate and hexane diamine;

(2) Tetrahydroxy compounds such as those prepared by the addition of alkylene oxides, such as propylene or ethylene oxide to diamines such as ethylene diamine;

(3) Hexahydroxy compounds, such as those prepared from sucrose, or those prepared by reacting propylene oxide with sorbitol to obtain chains of polyoxypropylene, each chain terminated with a hydroxyl group.

The proportions and amounts of the reactants determine, to a certain extent, the nature of the final product. The proportions of the reactants determine the molecular size of the product. As the functionality of the polyfunctional reactant is increased, the proportion of the intermediate reaction product should be increased and the molecular weight (chain length) of the difunctional alcohols or amines used in the formation of the intermediate reaction product should also be increased. In the absence of such control in the preparation of the modified isocyanate or isothiocyanate composition, the leather is adversely affected by the composition, as indicated by grain cracking when the leather is folded. The higher polymers generally do not exhibit the beneficial effects on the surface properties of leather treated with them that the large monomers and lower polymers disclosed herein achieve. It has also been observed that the application to leather, even in small amounts, of simple organic diisocyanates, such as tolylene diisocyanate, causes severe grain damage. To avoid this undesirable effect in preparing the modified isocyanate and isothiocyanate compositions described herein, stoichiometric amounts of diisocyanate or diisothiocyanate and polyfunctional alcohol or amine are employed in the formation of the reaction products so as to prevent damage to the leather by unreacted diisocyanate or diisothiocyanate. It is necessary to add an additional amount of diisocyanate or diisothiocyanate which is equivalent to the water in the di- and polyfunctional alcohol or amine and solvent components in order to obtain the desired yield of product. The reaction is allowed to proceed until the monomeric diisocyanate or diisothiocyanate is reacted to the extent that only trace amounts of this material are left in the final product. These trace quantities have little or no influence on the performance of the modified isocyanate or isothiocyanate product as a leather-treating chemical.

It was also observed that the addition of a greater proportion of the intermediate reaction product than the stoichiometric amount required to form a triisocyanate or triisothiocyanate with a trihydroxy compound or triamine would yield an effective and stable leather-treating composition. Various proportions of the reactants to form both the intermediate and the final isocyanate or isothiocyanate composition may be used, the only restriction being that the modified isocyanate or isothiocyanate composition applied to the leather contain not more than trace amounts of unreacted simple diisocyanate or diisothiocyanate starting material.

In general, isocyanates or isothiocyanates react with any substance containing active hydrogens, whereas they react only very slowly with the active hydrogen of carbamate or thiocarbamate groups. As the size of the molecule increases, the reaction rate of the isocyanate or isothiocyanate group with the active hydrogen of the carbamate or thiocarbamate group decreases even further. To further minimize the amount of interaction between isocyanate or isothiocyanate groups and active hydrogen, and thus to increase the stability during storage of the leather-treating compositions described herein, small amounts of organic chlorides containing a hydrolyzable chlorine atom are employed. These organic chlorides contain one or more hydrolyzable chlorine atoms per molecule. These chlorides are added to the reaction mixture in which the intermediate and final carbamate or thiocarbamate products are formed. Only a relatively small amount of the organic chloride need be added to the reaction mixture to obtain the desired effect. Some of the organic chlorides that can be used effectively for this purpose are orthochlorobenzoyl chloride and 2,4-dichlorobenzoyl chloride.

While the reaction to form the modified isocyanate or isothiocyanate composition does not require the presence of a mutual solvent or a diluent, the reaction mixture is more easily handled when a solvent-diluent is present. In the absence of such a diluent-solvent, the reaction mixture becomes quite viscous. There are many solvents that may be used. A basic requirement for the solvent is that it not interact with any of the reactants and that it not contain water to any appreciable extent. Preferably, the solvent should be free from water since additional diisocyanate reactant must be added to compensate for any water in the solvent. Some acetate esters are very satisfactory solvents. Toluene and/or xylene are satisfactory diluents. The diluent-solvent also faciltates the application of the modified isocyanate or isothiocyanate compositions to leather.

The modified isocyanate and isothiocyanate compositions described above are structurally tailored to be effective leather-treating materials at very low levels of treatment, thereby making the process of treating the leather with these materials very economical. Leather, which has been processed through the crusted state, has been treated successfully with a modified isocyanate composition, applying less than one gram of solids per square foot. Such treatment has resulted in as much as 200 to 300 percent improvement in scuff resistance in the subsequently finished leather as determined by the "International Scuff Tester." On some leathers, a greater concentration of the modified isocyanate composition is required to effect the same improvement in wearing qualities. In general, it is advisable to keep the level of treatment of the leather below 10 grams of solids per square foot, since, in addition to the economic reasons, even the highly modified isocyanate or isothiocyanate compounds described herein will cause some grain damage due to excessive cross linking with the leather and leather constituents, such as, some fat liquors and water vapor normally contained within the leather.

In the process of applying the modified isocyanate and isothiocyanate compositions to leather, a diluent-solvent is employed to assist in obtaining the desired degree of penetration of the leather grain. The addition of a diluent-solvent has already been disclosed; it has been indicated that the reaction mixture was more readily handled when a diluent-solvent was present. The same solvent employed as a diluent is also used as the solvent to aid in the application of the compositions to the leather. A solvent mixture may also be used. As indicated above, the only restriction on the use of a solvent is that it not interact with the isocyanate or isothiocyanate groups. An acetate ester alone, or in combination with toluene and/or xylene has proven to be a satisfactory diluent-solvent. Good results have been obtained with solutions containing 20 to 50 percent solids. Other concentrations of the modified isocyanate or isothiocyanate composition in the solvent are also possible and may be employed within the limitation of the method of application to the leather.

In the process of applying these compositions to leather, they are applied to the grain side of the leather. There are many acceptable methods of application. Among those methods that have been found acceptable are spraying, brushing, swabbing, and roller deposition. A dipping process, wherein both sides of the leather are treated is undesirable, since it is only necessary and desirable to treat the grain side of the leather. Treating both sides of the leather unduly increases the costs of the operation.

For clarity of understanding, the process disclosed herein for treating leather to achieve substantial improvement in surface properties will be summarized at this point. Leather that has been processed at least to the crusted state can be treated with beneficial results. A substituted-amine composition, containing both free isocyanate or isothiocyanate groups, or a mixture of the two, and substituted-amine linkages, is applied to the grain side of the leather. The substituted-amine composition is embodied in a diluent-solvent which acts as a carrier and diluent. The treating composition is applied in a concentration normally not exceeding 10 grams of solids per square foot of leather. After the composition has been applied, the leather is heated to evaporate the carrier solvent. The leather is ready for further processing after the solvent has been evaporated. However, there is even a further improvement produced in the surface properties of the leather by continuing the heating of the leather after the solvent has been driven off. This further heating continues and accelerates the curing effect which has been initiated by the first application of heat. The leather is now ready for the application of the base or pigment coat, and this step may proceed in the various ways presently employed in the leather industry. Thus, employing this process to improve the surface properties of the leather results in no significant alteration in the techniques or systems presently employed to apply the base or pigment coat, or any of the subsequent finish coats, to the leather.

A new leather product results from the treatment of crusted leather with these compositions in the manner described herein. This new leather product is unique in appearance and in physical characteristics. For example, it exhibits a marked improvement in both leather and finish "break" and in scuff and abrasion resistance.

The following examples are intended to more specifically and clearly illustrate the practice of this invention. All examples are on the basis of parts by weight.

*Example 1*

To 115 parts of 2,4-tolylene diisocyanate under an atmosphere of dry nitrogen and under constant agitation, were slowly added 225 parts of polypropylene glycol of an average molecular weight of 750. The mixture was heated 1 hour at 100° C. Then 0.57 part of orthochlorobenzoyl chloride was added followed by 157.5 parts of a trihydroxy polyoxypropylene having a hydroxyl number of 148.5 to 181.5 and an average molecular weight of 1030. This final mixture was reacted at 100° C. for 1 hour and diluted with a 1:1 mixture of Cellosolve acetate and toluene. Cellosolve acetate is the tradename for an acetate ester sold by Carbide and Carbon Chemicals Co. and is defined by the formula $CH_3COOCH_2CH_2OC_2H_5$.

Example 2

To 76.5 parts of an isomeric mixture of 2,4 and 2,6-tolylene diisocyanate under an atmosphere of dry nitrogen and under constant agitation was added a mixture of polyoxypropylene containing 102.5 parts of polypropylene glycol with an average molecular weight of 1025 and 202.5 parts of polypropylene glycol with an average molecular weight of 2025 dissolved in 127.3 parts of anhydrous Cellosolve acetate. The reaction mixture was heated to 100° C. and maintained at this temperature for 1½ hours. Orthochlorobenzoyl chloride, 0.4 part, was added; then 68.6 parts of a trihydroxy polyoxypropylene of an average molecular weight of 1000 was added slowly to the mixture, and the reaction mixture was heated to 100° C. for 2 hours, cooled and diluted with Cellosolve acetate to 35 percent solids.

Example 3

To 76 parts of 2,4-tolylene diisocyanate under an atmosphere of dry nitrogen and under constant agitation, 200 parts of polybutylene glycol of an average molecular weight of 1000 was slowly added and heated at 55° C. for 1½ hours. A mixture of ethyl acetate and Cellosolve acetate was used to reduce viscosity, then 23.1 parts of a trihydroxy polyoxypropylene with an average molecular weight of 700 was added slowly and reacted at 55° C. for 1½ hours. The mixture was then diluted further with a 1:1 mixture of ethyl acetate and Cellosolve acetate.

Example 4

To 76 parts of 2,4-tolylene diisocyanate under an atmosphere of dry nitrogen and under constant agitation, 200 parts of polybutylene glycol of an average molecular weight of 1000 was slowly added and the reaction mixture heated at 55° C. for 1½ hours. A mixture of ethyl acetate and Cellosolve acetate was used to reduce viscosity, then anhydrous castor oil, 32.2 parts, was added slowly and reacted at 55° C. for 1½ hours. The mixture was then diluted further with a 1:1 mixture of ethyl acetate and Cellosolve acetate.

Example 5

To 139.2 parts of 2,4-tolylene diisocyanate and 0.35 part of parachlorobenzoyl chloride under an atmosphere of dry nitrogen and under constant agitation, polyethylene glycol, 240 parts, of an average molecular weight of 600 was added. The mixture was reacted for 1½ hours at 60° C., then 195.1 parts of anhydrous castor oil was added and reacted for 1½ hours at 55° C. Ethyl acetate, 574.3 parts, was added during the reaction to reduce viscosity.

Example 6

To 50.4 parts of hexamethylene diisocyanate under an atmosphere of dry nitrogen and under constant agitation, polyethylene glycol, 20 parts, of an average molecular weight of 400, dissolved in 70.4 parts of n-butylacetate was added and reacted for 1 hour at 50° C. Then, 97.5 parts of an anhydrous castor oil in 97.5 parts of normal butylacetate were added and the mixture reacted for an additional 1 hour at 50° C.

Example 7

To 47.9 parts of an isomeric mixture of 2,4- and 2,6-tolylene diisocyanate under an atmosphere of dry nitrogen and under constant agitation, 253.1 parts of polypropylene glycol with an average molecular weight of 2025 were added slowly with 99.3 parts of Cellosolve acetate. The mixture was heated and reacted at 100° C. for 2 hours, then cooled. To this intermediate reaction product was added 23.9 parts of a hexahydroxy compound based on sorbitol with polyoxypropylene chains terminated with hydroxyl groups and this final mixture was reacted for 2½ hours at 100° C. Additional Cellosolve acetate was then added to yield a solution of approximately 35 percent solids.

Example 8

To 191.4 parts of 2,4-tolylene diisocyanate under an atmosphere of dry nitrogen and under constant agitation, polypropylene glycol, 1000 parts, with an average molecular weight of 2000 was added slowly. The mixture was heated at 100° C. for 2 hours and then cooled. Then 204 parts of a tetrahydroxy compound formed by the sequential addition of propylene and ethylene oxides to propylene glycol and having an average molecular weight of 1360 were added slowly to the intermediate reaction product and reacted for 2½ hours at 100° C. A 1:1 mixture of Cellosolve acetate and toluene was then added to yield a leather treating solution of 30 percent solids.

Example 9

In the preceding examples wherever a diisocyanate is used as one of the reactants, a diisothiocyanate can be substituted without effecting any appreciable change in the procedure followed in the preparation of the desired modified isothiocyanate compound.

Example 10

In place of 76.5 parts of the isomeric mixture of 2,4- and 2,6-tolylene diisocyanate used in Example 2, 84.5 parts of p-phenylene diisothiocyanate were employed. The other reactants and conditions used to form the final reaction product were identical to those given in Example 2. A modified diisothiocyanate product resulted.

Example 11

Hexamethylene diisothiocyanate, 88 parts, was used in place of the isomeric mixture of 2,4- and 2,6-tolylene diisocyanate cited in Example 2. The other reactants and conditions used to form the final reaction product were identical to those given in Example 2. A modified diisothiocyanate product resulted.

Example 12

Example 2 was repeated, except that an inorganic diisocyanate, sulfodiisocyanate, 58.1 parts, was used in place of the isomeric mixture of 2,4- and 2,6-tolylene diisocyanate. A modified diisocyanate product was obtained.

Example 13

A chrome-tanned, mill dyed, full-grain cowhide shoe-upper leather in the dry, crusted state was first covered with a light sealer coat containing 3 to 4 percent acrylic type resin, and dried. Then the modified isocyanate composition in Example 2 was applied by spray as a 35 percent solution in Cellosolve acetate to deposit 3 to 4 grams solids per square foot of leather. The treated leather was dried, cured, and then finished as normal leather. The finished leather showed a significant improvement in both finish and leather break and a 100 to 200 percent improvement in finish scuff resistance as determined by the "International Scuff Tester."

Example 14

A chrome-tanned, vegetable-retanned, corrected-grain cowhide shoe-upper leather was treated in the crust by swabbing with a 20 percent solution of the modified isocyanate composition prepared from tolylene diisocyanate, polypropylene glycols having molecular weights of 1025 and 2025 and a trihydroxy polyoxypropylene. This leather after finishing shows significant improvement over other finished leathers in break properties and in scuff and abrasion resistance.

Example 15

The modified isocyanate composition prepared in Example 2 can be applied by roller to vegetable-tanned, corrected-grain case leather. The leather is then dried. After finishing, the leather shows significant improvement in break properties, and in scuff and abrasion resistance over other leather.

Example 16

The modified isocyanate composition of Example 6 can be applied by spraying to the grain side of vegetable-tanned, corrected-grain case leather. The leather is dried. After finishing, the leather shows significant improvement in break properties and in scuff and abrasion resistance.

Example 17

When the grain side of leather is impregnated with a modified diisothiocyanate composition prepared in accordance with the procedure described above, the surface properties of the leather would be enhanced in the same manner as when the grain side of the leather is impregnated with a modified diisocyanate composition.

Example 18

The modified isocyanate composition prepared in Example 12 was applied to the grain side of leather. The leather was then dried. After finishing, the leather showed significant improvement in its break properties as well as in scuff and abrasion resistance.

It is to be understod that changes and variations may be made without departing from the spirit and scope of the invention as defined in the appended claims.

What is claimed is:

1. A process for treating crusted leather comprising the step of: applying to the grain side of the leather a composition characterized by having polyvalent organic radicals connected by substituted-amine groups, said groups being selected from the group consisting of a carbamate, thiocarbamate, substituted urea, and substituted thiourea, and having the radical NCY as free terminal groups, where Y is selected from the group consisting of oxygen and sulfur.

2. A process for treating crusted leather comprising the step of: applying to the grain side of the leather a diluent-solvent containing a composition characterized by having polyvalent organic radicals connected by substituted-amine groups, said groups being selected from the group consisting of a carbamate, thiocarbamate, substituted urea, and substituted thiourea, and having the radical NCY as free terminal groups, where Y is selected from the group consisting of oxygen and sulfur.

3. A process for treating crusted leather comprising the steps: (1) applying to the grain side of the leather a diluent-solvent containing a composition characterized by having polyvalent organic radicals connected by substituted-amine groups, said groups being selected from the group consisting of a carbamate, thiocarbamate, substituted urea, and substituted thiourea, and having the radical NCY as free terminal groups, where Y is selected from the group consisting of oxygen and sulfur; and (2) driving off the diluent-solvent by heating.

4. A process for treating leather, where said leather has previously been processed to the crusted state comprising the steps of: (1) applying to the grain side of the leather a diluent-solvent containing a substituted amine composition selected from the group consisting of

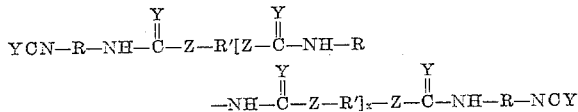

and

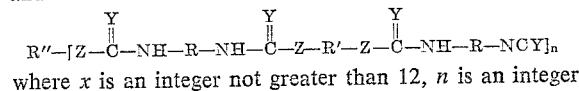

where $x$ is an integer not greater than 12, $n$ is an integer greater than 2, R is a divalent radical selected from the group consisting of alkylene, arylene, and alkarylene radicals, R' is a divalent organic radical selected from the group consisting of polyoxyalkylene, polyalkylene, polyalkylene carbonate, and alkylene polyamide radicals, R" is a polyvalent organic radical derived from a compound selected from the group of compounds consisting of polyhydroxyglycerides, aliphatic polyols, polyalkylene oxide condensation products of polyhydroxyglycerides, and polyalkylene oxide condensation products of aliphatic polyols, Z is a radical selected from the group consisting of —O— and —NH— radicals, and Y is an atom selected from the group consisting of oxygen and sulfur; and (2) driving off the diluent-solvent by heating.

5. The process of claim 4 wherein the diluent-solvent is an acetate ester.

6. The product resulting from the process of claim 4.

7. A process for treating crusted leather comprising the steps of: (1) applying to the grain side of the leather a diluent-solvent containing a modified isocyanate composition defined by the formula

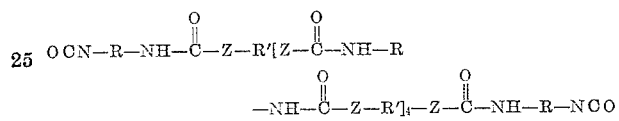

where R is a divalent radical selected from the group consisting of alkylene, arylene, and alkarylene radicals, R' is a divalent organic radical selected from the group consisting of polyoxyalkylene, polyalkylene, polyalkylene carbonate, and alkylene polyamide radicals having an average molecular weight in the range 400 to 2000 and Z is a radical selected from the group consisting of —O— and —NH— radicals, and (2) driving off the diluent-solvent by heating.

8. A process for treating crusted leather comprising the steps of: (1) applying to the grain side of the leather a diluent-solvent containing a modified isocyanate composition defined by the formula

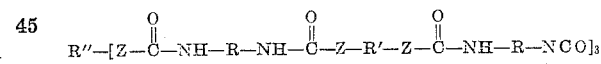

where Z is a radical selected from the group consisting of —O— and —NH— radicals, R is a divalent organic radical selected from the group consisting of alkylene, arylene, and alkarylene radicals, R' is a divalent organic radical selected from the group consisting of polyoxyalkylene, polyalkylene, polyalkylene carbonate, and alkylene polyamide radicals having a molecular weight in the range 400 to 2000, and R" is a polyvalent organic radical derived from a compound selected from the group of compounds consisting of polyhydroxyglycerides, aliphatic polyols, polyalkylene oxide condensation products of polyhydroxyglycerides, and polyalkylene oxide condensation products of aliphatic polyols having a molecular weight in the range 400 to 2000; and (2) driving off the diluent-solvent by heating.

9. A process for treating crusted leather comprising the steps of: (1) applying to the grain side of the leather an acetate ester solvent containing 20 to 50 percent by weight of a modified isocyanate composition defined by the formula

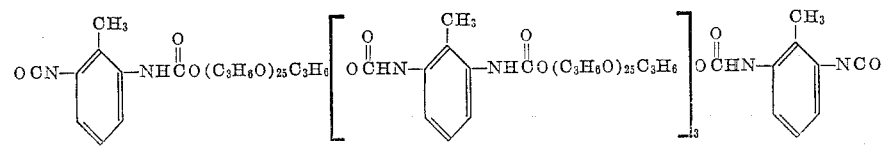

and (2) heating the leather to drive off the acetate ester solvent.

10. A process for treating crusted leather comprising the steps of: (1) applying to the grain side of the leather an acetate ester solvent containing 20 to 50 percent by weight of a modified isocyanate composition defined by the formula

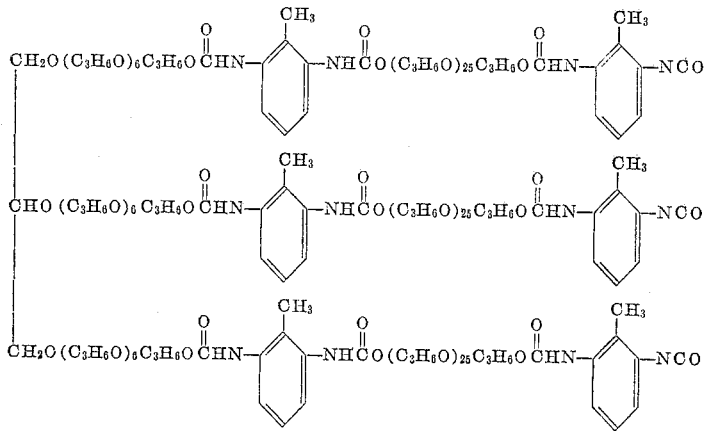

(2) heating the leather to drive off the acetate ester-solvent.

11. A process for treating crusted leather comprising the steps of: (1) applying to the grain side of the leather a diluent-solvent containing a modified isothiocyanate composition defined by the formula

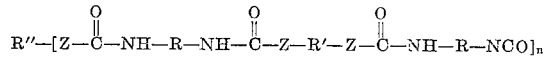

where Z is a radical selected from the group consisting of —O— and —NH— radicals, R is a divalent radical selected from the group consisting of alkylene, arylene, and alkarylene radicals, R' is a divalent organic radical selected from the group consisting of polyoxyalkylene, polyalkylene, polyalkylene carbonate, and alkylene polyamide radicals having a molecular weight in the range 400 to 2000, and R" is a polyvalent organic radical derived from a compound selected from the group of compounds consisting of polyhydroxyglycerides, aliphatic polyols, polyalkylene oxide condensation products of polyhydroxyglycerides, and polyalkylene oxide condensation products of aliphatic polyols having a molecular weight in the range 400 to 2000; and (2) driving off the diluent-solvent by heating.

12. A new composition of matter comprising a modified isocyanate composition defined by the formula

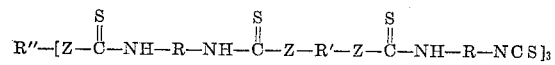

where $n$ is an integer greater than 2, R is a divalent radical selected from the group consisting of alkylene, arylene, and alkarylene radicals, R' is a divalent organic radical selected from the group consisting of polyoxyalkylene, polyalkylene, polyalkylene carbonate, and alkylene polyamide radicals and having an average molecular weight in the range 200 to 4000, R" is a polyvalent organic radical derived from a compound selected from the group of compounds consisting of polyhydroxyglycerides, aliphatic polyols, polyalkylene oxide condensation products of polyhydroxyglycerides, and polyalkylene oxide condensation products of aliphatic polyols having an average molecular weight in the range 200 to 4000, and Z is a radical selected from the group consisting of —O— and —NH— radicals.

13. A new composition of matter comprising a modified isothiocyanate composition defined by the formula

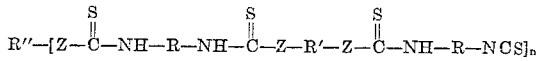

where $n$ is an integer greater than 2, R is a divalent radical selected from the group consisting of alkylene, arylene, and alkarylene radicals, R' is a divalent organic radical selected from the group consisting of polyoxyalkylene, polyalkylene, polyalkylene carbonate, and alkylene polyamide radicals having an average molecular weight in the range of 200 to 4000, R" is a polyvalent organic radical derived from a compound selected from the group of compounds consisting of polyhydroxyglycerides, aliphatic polyols, polyalkylene oxide condensation products of polyhydroxyglycerides, and polyalkylene oxide condensation products of aliphatic polyols having an average molecular weight in the range 200 to 4000, and Z is a radical selected from the group consisting of —O— and —NH— radicals.

14. A new composition of matter comprising a modified isocyanate composition defined by the formula

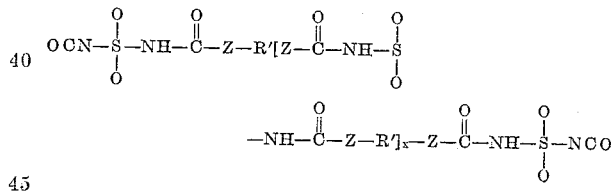

where $x$ is an integer not greater than 12, R' is a divalent organic radical selected from the group consisting of polyoxyalkylene, polyalkylene, polyalkylene carbonate, and alkylene polyamide radicals having an average molecular weight in the range 200 to 4000, and Z is a radical selected from the group consisting of —O— and —NH— radicals.

References Cited in the file of this patent

UNITED STATES PATENTS

| | | |
|---|---|---|
| 2,303,364 | Schirm | Dec. 1, 1942 |
| 2,620,516 | Muller | Dec. 9, 1952 |
| 2,625,535 | Mastin et al. | Jan. 13, 1953 |
| 2,718,516 | Bortnick | Sept. 20, 1955 |
| 2,855,421 | Bunge et al. | Oct. 7, 1958 |
| 2,861,981 | Frank et al. | Nov. 25, 1958 |
| 2,948,691 | Windemuth et al. | Aug. 9, 1960 |

FOREIGN PATENTS

| | | |
|---|---|---|
| 815,185 | Great Britain | Mar. 10, 1958 |
| 206,295 | Australia | Feb. 10, 1955 |
| 208,982 | Australia | July 4, 1957 |

OTHER REFERENCES

J.A.L.C.A., vol. 53, No. 6, June 1958, pp. 336–346.

UNITED STATES PATENT OFFICE
CERTIFICATE OF CORRECTION

Patent No. 3,066,997 December 4, 1962

Maynard B. Neher et al.

It is hereby certified that error appears in the above numbered patent requiring correction and that the said Letters Patent should read as corrected below.

Column 2, line 45, for that portion of the formula reading "20 CN-" read -- 2 OCN- --; line 68, for that portion of the formula reading "3 OCN-" read -- 3 OCN- --.

Signed and sealed this 28th day of May 1963.

(SEAL)
Attest:

ERNEST W. SWIDER
Attesting Officer

DAVID L. LADD
Commissioner of Patents